United States Patent
Chakraborty et al.

(10) Patent No.: US 12,154,198 B2
(45) Date of Patent: Nov. 26, 2024

(54) METHODS AND SYSTEMS FOR AUTOMATED STRUCTURED KEYBOARD LAYOUT GENERATION

(71) Applicant: ZEBRA TECHNOLOGIES CORPORATION, Lincolnshire, IL (US)

(72) Inventors: Joydeep Chakraborty, Bangalore (IN); Mukesh Prabhakar, Bangalore (IN); Vinay Shivaprakash, Bangalore (IN); Krishna Raja, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 150 days.

(21) Appl. No.: 17/727,335

(22) Filed: Apr. 22, 2022

(65) Prior Publication Data

US 2023/0343005 A1 Oct. 26, 2023

(51) Int. Cl.
| | |
|---|---|
| *G06T 11/60* | (2006.01) |
| *G06F 3/04886* | (2022.01) |
| *G06F 9/451* | (2018.01) |
| *G06V 30/18* | (2022.01) |
| *G06V 30/19* | (2022.01) |

(52) U.S. Cl.
CPC .......... *G06T 11/60* (2013.01); *G06F 3/04886* (2013.01); *G06F 9/451* (2018.02); *G06V 30/1801* (2022.01); *G06V 30/19173* (2022.01)

(58) Field of Classification Search
CPC ................ G06T 11/60; G06V 30/1801; G06V 30/19173
See application file for complete search history.

(56) References Cited

U.S. PATENT DOCUMENTS

| | | | | |
|---|---|---|---|---|
| 2012/0017161 A1* | 1/2012 | Hirshberg | ........... | G06F 3/04886 715/762 |
| 2015/0084869 A1* | 3/2015 | Kim | ........... | G06F 3/023 345/168 |
| 2017/0061696 A1* | 3/2017 | Li | ........... | G02B 27/017 |
| 2018/0350150 A1* | 12/2018 | Powderly | ........... | G06F 3/0426 |
| 2021/0132683 A1* | 5/2021 | Herling | ........... | G02B 27/0093 |
| 2022/0172397 A1* | 6/2022 | Herling | ........... | G06V 20/20 |

OTHER PUBLICATIONS

McGill, Mark et al., "Creating and Augmenting Keyboards for Extended Reality with the Keyboard Augmentation Toolkit", ACM Transactions on Computer-Human Interaction, vol. 29 iss 2 Article No. 15, pp. 1-39, Jan. 2022, https://doi.org/10.1145/3490495 (Year: 2022).*

* cited by examiner

*Primary Examiner* — Michelle L Sams

(57) ABSTRACT

A method includes: obtaining an image of a keyboard layout; detecting, from the image, a plurality of key boundaries; determining a label string for a portion of the image defined by a corresponding key boundary from the plurality of key boundaries; selecting, for the determined label string, a corresponding key action; generating a keyboard layout definition for the image of the keyboard layout, the keyboard layout definition including a key definition for the corresponding key boundary, the key definition having: (i) a position for rendering of a key, (ii) a label configured to be rendered at the position of the key, and (iii) an action configured to be caused by selection of the key; and communicating the keyboard layout definition for deployment to a mobile device.

17 Claims, 9 Drawing Sheets

METHODS AND SYSTEMS FOR AUTOMATED STRUCTURED KEYBOARD LAYOUT GENERATION

BACKGROUND

Computing devices having touch sensors integrated with display panels can be configured to render virtual keyboards for use in receiving input, e.g., from operators of such devices. Virtual keyboards can be provided in a wide variety of layouts, e.g., dependent on the context in which a computing device is deployed. The creation of virtual keyboard layouts for deployment to other computing devices, however, is a time-consuming and error-prone process.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
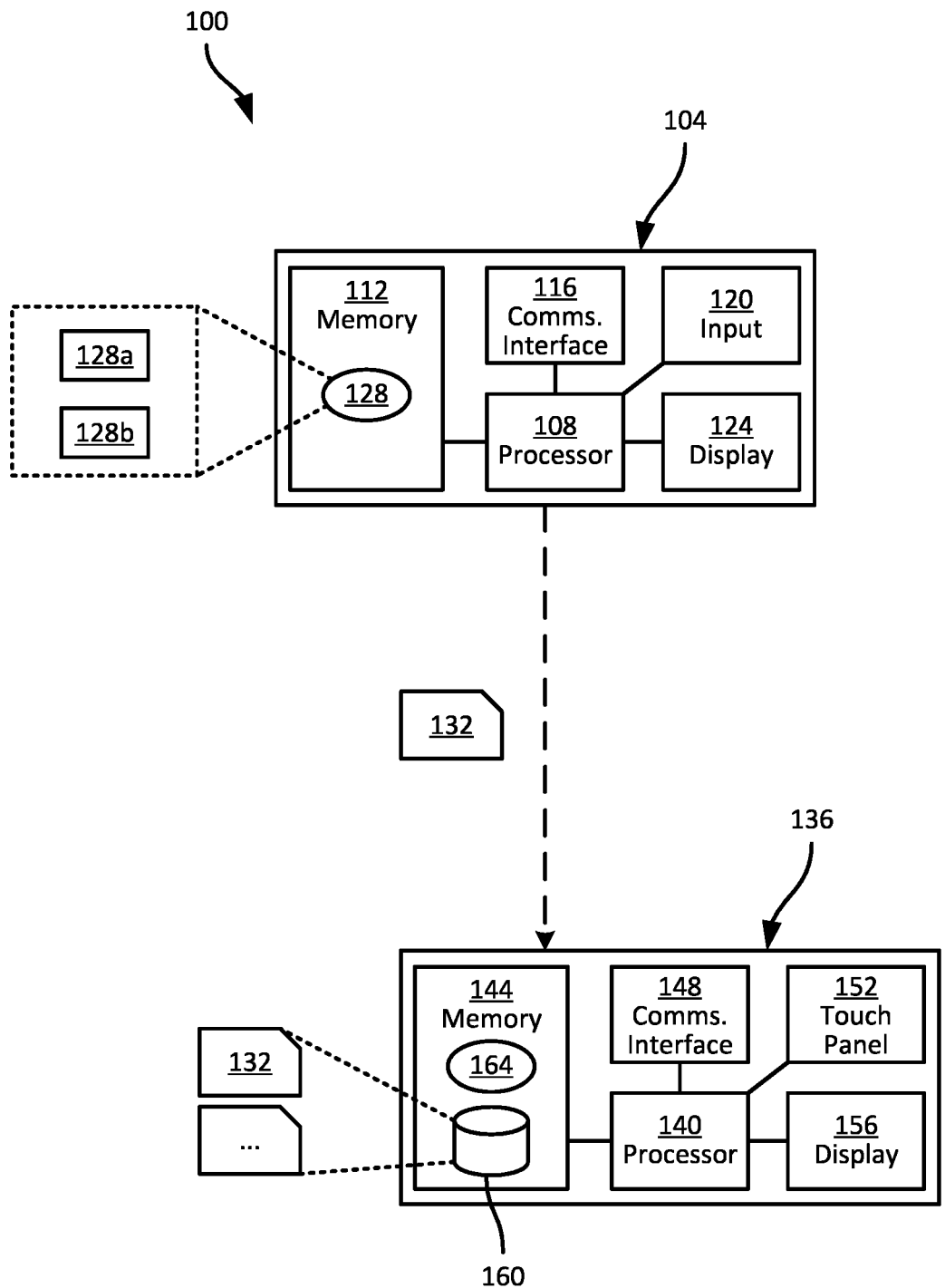
FIG. 1 is a diagram of a system for automated structured keyboard layout generation.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method, comprising: obtaining an image of a keyboard layout; detecting, from the image, a plurality of key boundaries; determining a label string for a portion of the image defined by a corresponding key boundary from the plurality of key boundaries; selecting, for the determined label string, a corresponding key action; generating a keyboard layout definition for the image of the keyboard layout, the keyboard layout definition including a key definition for the corresponding key boundary, the key definition having: (i) a position for rendering of a key, (ii) a label configured to be rendered at the position of the key, and (iii) an action configured to be caused by selection of the key; and communicating the keyboard layout definition for deployment to a mobile device.

Additional examples disclosed herein are directed to a computing device, comprising: a communications interface; and a processor configured to: obtain an image of a keyboard layout; detect, from the image, a plurality of key boundaries; determine a label string for a portion of the image defined by a corresponding key boundary from the plurality of key boundaries; select, for the determined label string, a corresponding key action; generate a keyboard layout definition for the image of the keyboard layout, the keyboard layout definition including a key definition for the corresponding key boundary, the key definition having: (i) a position for rendering of a key, (ii) a label configured to be rendered at the position of the key, and (iii) an action configured to be caused by selection of the key; and communicate the keyboard layout definition for deployment to a mobile device via the communications interface.

FIG. 1 illustrates a system 100 for the automated generation of structured keyboard layout definitions. A structured keyboard layout definition, as will be apparent to those skilled in the art, includes a plurality of parameters defining the positions, appearances, and functions of a set of virtual keys making up a virtual keyboard. The above-mentioned parameters can be stored in a predefined file format, according to a predefined schema (e.g., based on Extensible Markup Language (XML), or the like). Deployment of the file(s) of the layout definition to a computing device with a display and touch screen therefore enables that computing device to render a virtual keyboard having keys with appearances and functions as indicated in the definition. In other words, structured keyboard layout definitions enable such computing devices to render any of a wide variety of keyboard layouts.

Prior to deployment of a keyboard layout definition to a computing device, the keyboard layout definition is created, e.g., at a separate computing device from the device(s) that will later make use of the definition. In some systems, the parameters for a keyboard layout definition are provided to a computing device as input, e.g., by an operator of the computing device. As will be apparent, the number and variability of such parameters may be substantial. For example, the creation of a keyboard layout including twenty keys may involve the provision of several values for each key to specify the rendered position of that key, along with further values to specify the text rendered on the key, the action taken upon selection of the key, and the like. Creation of a layout definition, in other words, may involve the manual provision of tens or hundreds of parameters, such that the process of creating a keyboard layout definition is time-consuming and error-prone.

In some cases, a keyboard layout definition may be created according to a visual representation of a desired layout, e.g., presented to the operator tasked with creating the layout in the form of an image such as a screenshot of a layout from another client device, a photograph, or the like. Such visual representations may be referred to as unstructured keyboard layouts, given that although they represent a keyboard layout visually, they do not include any of the parameters necessary for the keyboard layout to be implemented, nor do they contain any information in the specified file format or schema consumed by the above-mentioned client devices. The creation of a keyboard layout definition based on a reference image may therefore still involve manual entry of the above-mentioned parameters. Automatic processing of the image to discover those parameters may be complicated or prevented by various technical obstacles. For example, applying optical character recognition (OCR) processes to an image containing an unstructured keyboard layout may result in strings of text that dissociates the labels on individual keys from the positions of those keys. Further, the simple application of OCR processes does not enable the discovery of certain parameters, such as the functions assigned to each key (e.g., the output to be generated when the key is selected).

The system 100, as will be discussed below, includes components and functionality enabling the automatic generation of at least partial keyboard layout definitions from images containing unstructured keyboard layouts.

In particular, the system 100 includes a computing device 104, which may also be referred to as the developer device 104 or simply the device 104. The device 104 implements functionality enabling the extraction of keyboard layout parameters from an image containing an unstructured keyboard layout. The device 104 includes a processor 108 (e.g., a central processing unit (CPU), graphics processing unit (GPU), or the like), interconnected with a non-transitory computer readable storage medium, such as a memory 112. The memory 112 includes a suitable combination of volatile and non-volatile memory elements. The processor 108 and the memory 112 each comprise one or more integrated circuits. The device 104 also includes a communications interface 116 enabling the device 104 to exchange data with other computing devices, e.g., via one or more networks, peer-to-peer connections, and the like. The device 104 further includes an input assembly 120, such as one or more of a keyboard, a mouse, a touch screen, and the like. Further, the device 104 includes a display 124.

The memory 112 stores computer readable instructions for execution by the processor 108, in the form of one or more applications. In the illustrated example, the applications stored in the memory 112 include a keyboard layout generator application 128, whose execution by the processor 108 configures the processor 108 to perform various functions related to the automated generation of keyboard layout definitions based on images containing unstructured keyboard layouts. Those functions are described further below in greater detail.

The application 128 can be implemented as a set of modules in some examples. Such modules can also, in other examples, be implemented via distinct, special-purpose controllers, such as field-programmable gate arrays (FPGAs), application-specific integrated circuits (ASICs), or the like. In other examples, the modules of the application 128 need not be subdivided as illustrated, or can be implemented as distinct applications stored in the memory 112. In the illustrated example, the application 128 includes an import module 128a, configured to import an image of a keyboard layout (lacking structured information defining the layout), and analyze the image to extract structured keyboard layout information. The application 128 also includes an editing module, configured to present an interface (e.g., on the display 124) depicting the structured keyboard layout information extracted by the import module 128a and enabling modification of such information, as well as deployment of a finalized keyboard layout.

A structured keyboard layout definition 132 generated by the computing device 104 based at least in part on an input image, via the above-mentioned functions enabled by the application 128, can be deployed to a client computing device 136, such as a mobile computing device (e.g., a smart phone, a tablet computer, or the like).

The device 136 includes a processor 140 and a memory 144, as well as a communications interface 148 and input/output assemblies such as a touch panel 152 and a display 156. The display 156 can be integrated with the touch panel 152, such that the processor 140 can control the display 156 to present a virtual keyboard according to the definition 132, and interpret contact with the touch panel 152 as selections of keys of the virtual keyboard. The device 136 can include a wide variety of other input assemblies in addition to or instead of the touch panel 152 and display 156, including, for example, a projector to render a virtual keyboard, and a camera to capture a position of an operator's hand on the projected virtual keyboard. Upon deployment of the definition 132 to the device 136, the memory 144 can store the definition 132, and optionally any suitable number of other keyboard definitions, in a repository 160. Deployment can include transmitting the definition 132 to the device 136 via a network, a local connection (e.g., a universal serial bus (USB) connection), or the like. The repository 160 is accessible to any of a plurality of applications stored in the memory 144, such as an application 164. The application 164 may, for example, including a configuration setting indicating which of the keyboard layout definitions in the repository 160 to use.

Figure 2:
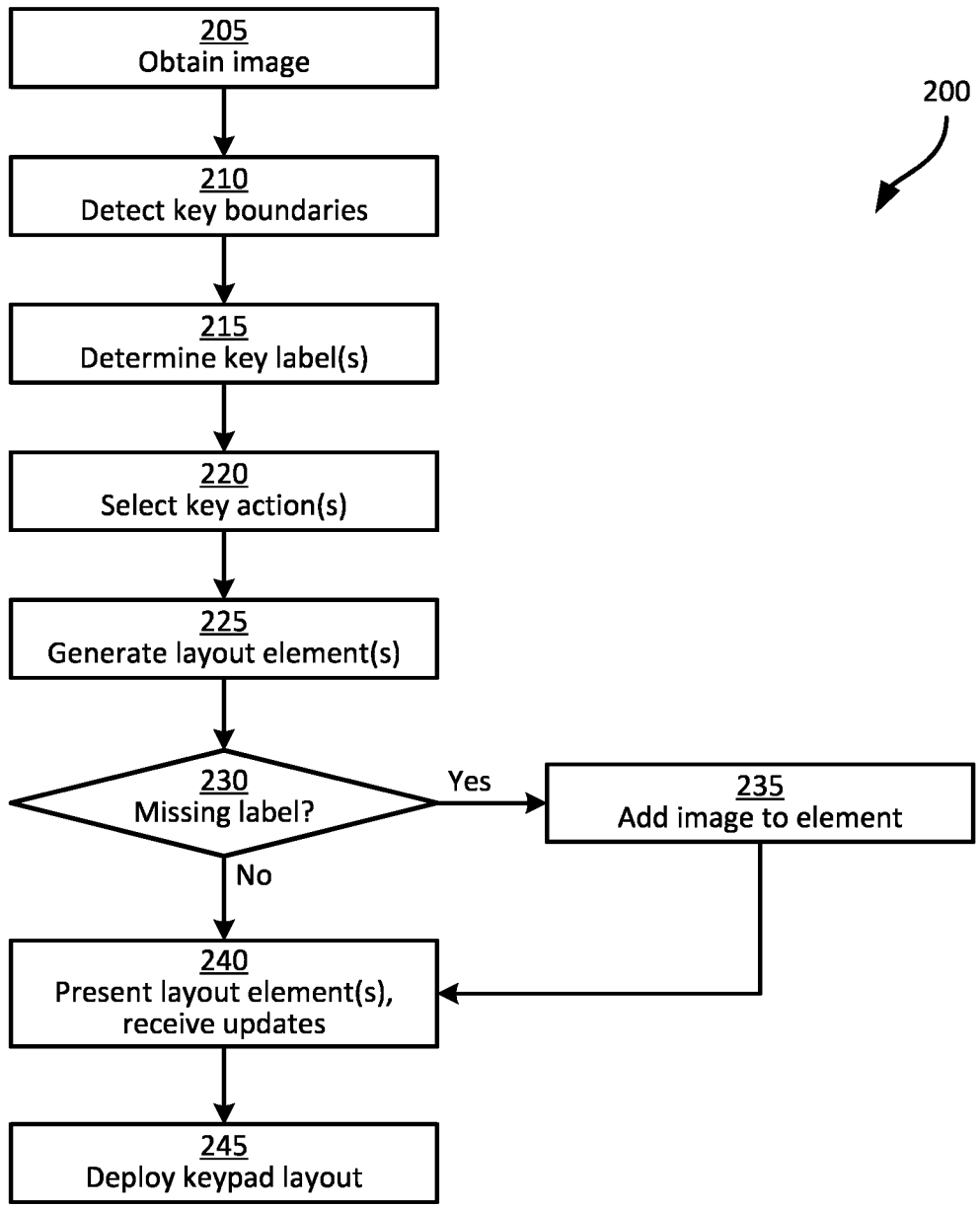
FIG. 2 is a flowchart of a method for automated structured keyboard layout generation.

Turning to FIG. 2, a method 200 of automated generation of structured keyboard layout definitions is illustrated. The method 200 will be discussed below in connection with its performance by the device 104, e.g., via execution of the application 128 by the processor 108.

The automated generation of a keyboard layout definition in the method 200 is based on an input image depicting at least some properties of the desired keyboard layout. Thus, at block 205 the device 104 is configured to obtain an input image containing an unstructured keyboard layout. The image may be stored in the memory 112, and to obtain the input image, the processor 108 can receive input data specifying the storage location of the image, e.g., via the application 128. For example, a graphical interface rendered on the display 124 via execution of the application 128 can include a selectable element to import an image for processing via the application 128. In other examples, the image can be retrieved from another computing device via the communications interface 116.

Figure 3:
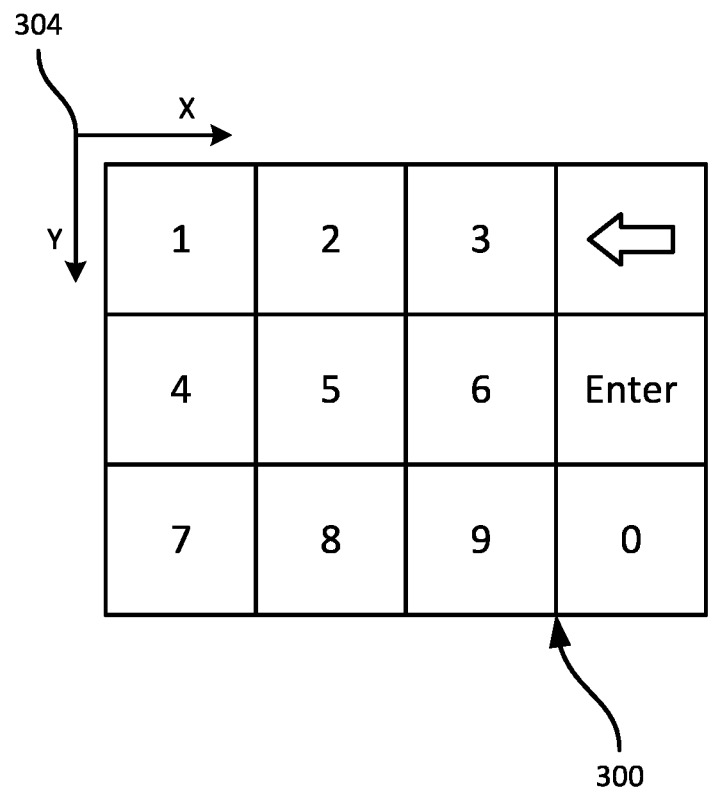
FIG. 3 is a diagram of an input image obtained at block 205 of the method of FIG. 2.

Turning to FIG. 3, an example input image 300 is shown. Although the image 300 depicts a keyboard layout, including twelve keys in this example, the keyboard layout in the image 300 is unstructured, in that the image 300 does not contain data explicitly identifying any distinct keys, labels, or actions associated with those keys. Instead, the image 300 may simply be an array of pixels, each having a position (e.g., expressed in an image coordinate system 304) and one or more color values.

Returning to FIG. 2, having obtained the image 300 at block 205, the processor 108 is configured, at block 210, to detect a plurality of key boundaries from the image 300. Detection of key boundaries can be achieved via a variety of grid- and/or edge-detection operations, implemented according to a suitable image-processing library (e.g., OpenCV). For example, the performance of block 210 can include a sequence consisting of an edge detection algorithm, a blurring algorithm (e.g., a Gaussian blur), and a Hough transform. Such a sequence results in the identification of objects with distinct edges in the image 300, which in this example correspond to individual keys of the unstructured keyboard layout.

Figure 4:
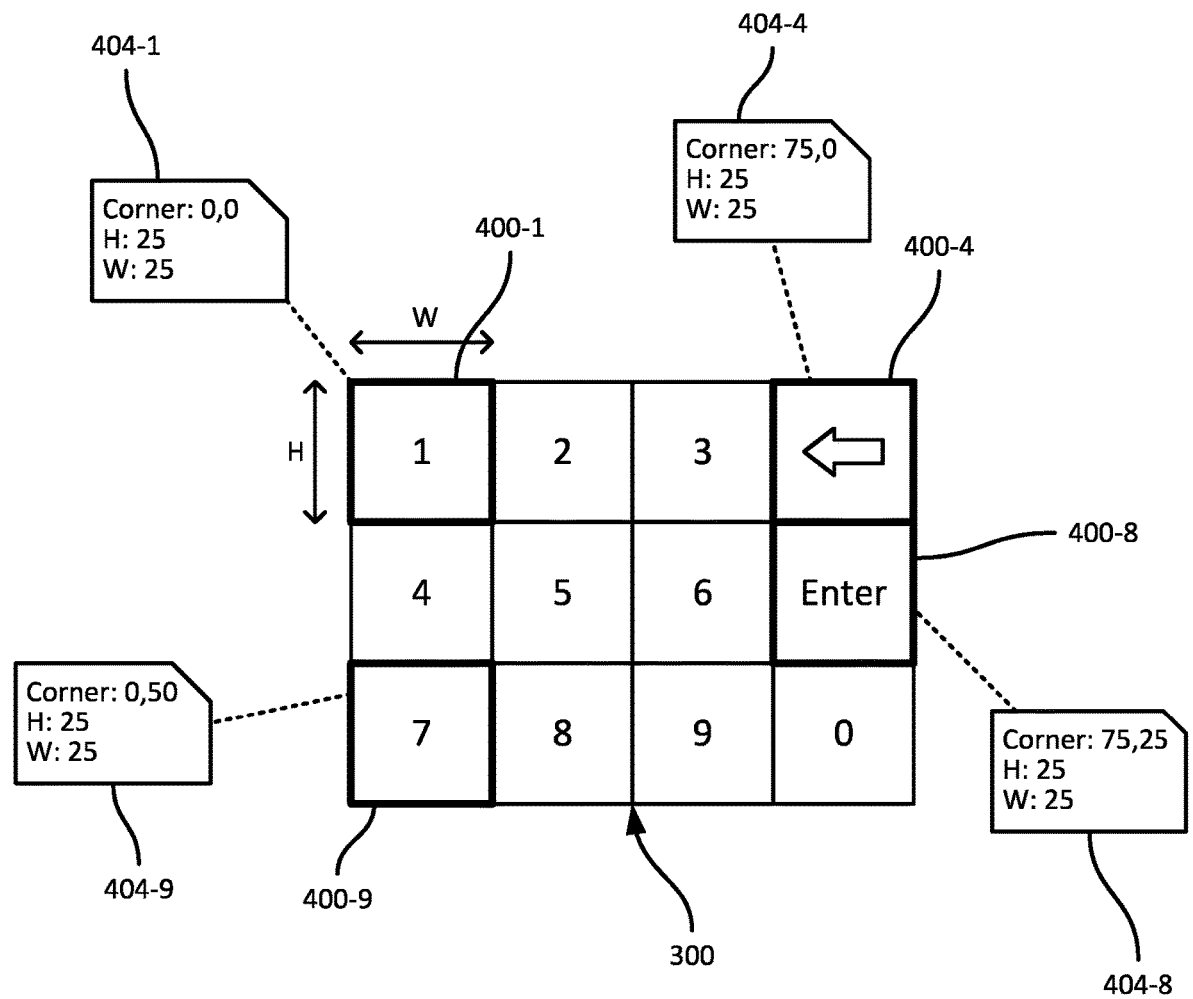
FIG. 4 is a diagram illustrating an example performance of block 210 of the method of FIG. 2.

Turning to FIG. 4, the image 300 is shown along with three example key boundaries 400-1, 400-4, 400-8, and 400-9 (collectively referred to as the key boundaries 400, and generically as a key boundary 400), detected at block 210 and indicated with heavier line weights. Values representing the key boundaries 400 are stored in key definitions 404-1, 404-4, 404-8, and 404-9 (collectively referred to as the key definitions 404, and generically as a key definition 404).

The values stored in the definitions 404 include the image coordinates (according to the coordinate system 304 shown in FIG. 3) of a top-left corner, as well as a width "W" and a height "H" for each boundary (the height and width are labelled for the boundary 400-1 for clarity). As will be apparent, the key boundaries 400 can also be defined in various other ways, including by coordinates for two or more corners, or the like. When the detected boundaries are not rectangular, the key boundaries 400 can be defined by further parameters (e.g., center coordinates and a radius, for circular keys).

Referring again to FIG. 2, at block 215 the processor 108 is configured to determine respective label strings for a set of the key boundaries from block 210. In some examples, the processor 108 may determine a label string for each key boundary 400 from block 210. In some examples, however, as discussed below, determination of a label string for certain key boundaries 400 may be complicated by various factors.

A label string, in general, is a string of characters (e.g., text) corresponding to the label associated with a virtual key. When the keyboard definition is deployed and rendered, e.g., a the client device 136, each key is rendered with the label thereon. The determination of a key label for a given key boundary 400 at block 215 therefore includes the extraction of text, numbers, or other characters, from the portion of the image 300 within the boundary 400.

In the present example, the processor 108 is configured to perform block 215 by extracting patches of the image 300 corresponding to each key boundary 400, according to the key definitions 404. Each extracted patch is then processed separately (although some or all patches can be processed in parallel), to mitigate against the incorrect association of text appearing on one virtual key with a different virtual key.

Figure 5:
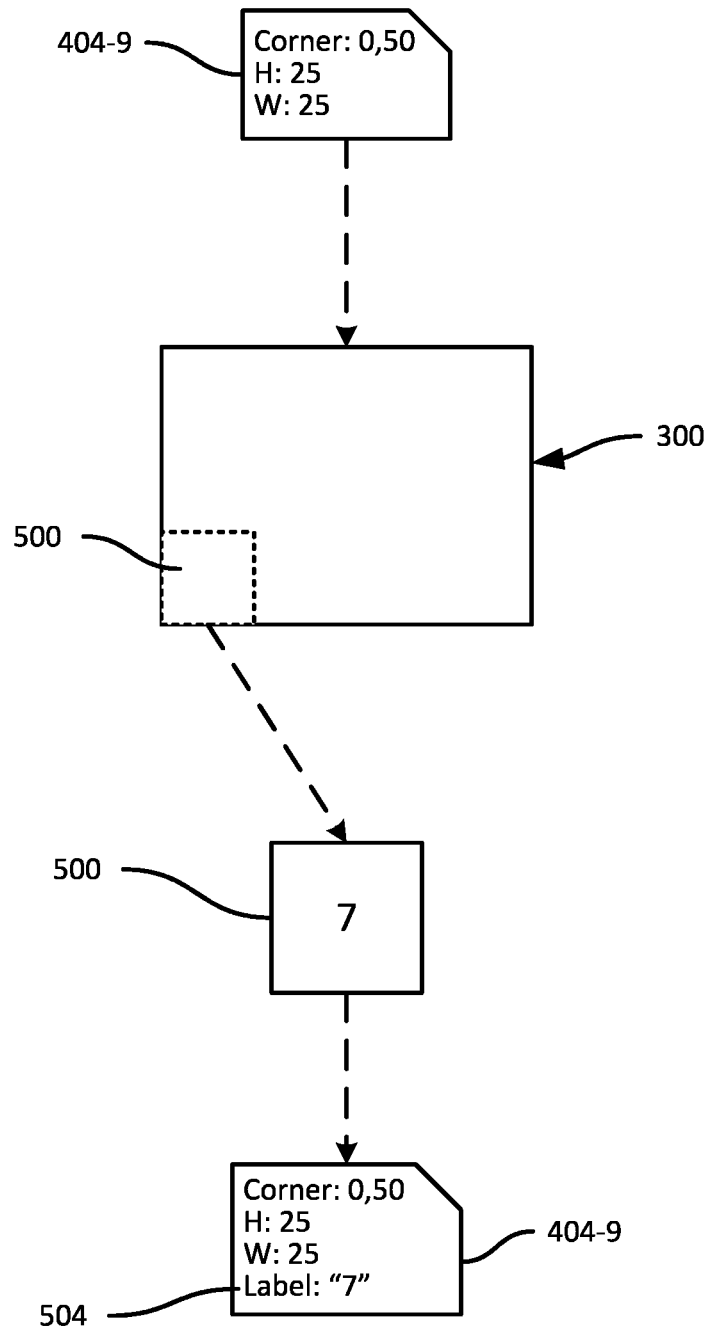
FIG. 5 is a diagram illustrating an example performance of block 215 of the method of FIG. 2.

Turning to FIG. 5, an example performance of block 215 for the key boundary 400-9 is shown. In particular, based on the key definition 404-9, the processor 108 is configured to extract a patch 500 from the image 300. The patch 500, that is, has a top-left corner at the coordinates [0, 50] in the system 304, a width of twenty-five pixels, and a height of twenty-five pixels. The processor 108 is then configured to apply a label recognition operation to the patch 500, such as an OCR process. The OCR process, in this example, returns a string containing the character "7", and the processor 108 can be configured to store the string 504 in the definition 404-9. The label strings determined at block 215 can include various other attributes, including font, font size, label string color, background color, and the like.

As will be apparent, certain virtual keys may be labelled with indicia that are not readily detectable via OCR. For example, turning to FIG. 6, another example performance of block 215, for the key boundary 400-4, is illustrated. In particular, the processor 108 extracts a patch 600 from the image 300 according to the key definition 404-4. Applying an OCR process to the patch 600, however, may fail as the patch 600 contains an arrow shape rather than a text character. In some examples, therefore, the processor 108 can update the definition 404-4 to include an indicator 604 that no label string was detected.

In other examples, however, the processor 108 can be configured to provide the patch 600 as an input to a classification module, such as a machine-learning module (e.g., a neural network or the like) trained to recognize various icons or other shapes appearing on keyboards. The processor 108 may, for example, initiate the classification function upon detecting that the OCR function failed. In other examples, the OCR function and classification function may be integrated into a single classifier capable of detecting both text strings and other shapes, such as the arrow contained in the patch 600. In any event, through application of a classification function, in some examples the processor can obtain a label string 608 "backspace" from the patch 600. The label strings shown in FIGS. 5 and 6 can be represented in various forms, including, for example, Unicode identifiers (e.g., "0x08" for the backspace label, which is the relevant hexadecimal UTF-8 encoding for the backspace key).

Returning to FIG. 2, following the performance of block 215 for each key boundary 400 detected at block 210 (whether or not each such performance resulted in the determination of a key label), at block 220 the processor 108 is configured to select key actions for at least a set of the key boundaries for which key labels were determined. A key action, as will be apparent to those skilled in the art, indicates the input data generated upon selection of the key, e.g., at the client device 136.

In some examples, an action is selected for every key label. Because the selection of a key action is based on the key label, the processor 108 can be configured to ignore any key boundary for which no label was determined when performing block 220. Selection of key actions at block 220 is based on a mapping of label strings to key actions, e.g., stored in the memory 112 in association with the application 128 (e.g., integrated with the application 128). Selection of a key action for a given label string, therefore, includes locating the label string in the mapping, and retrieving the corresponding key action.

Figure 7:
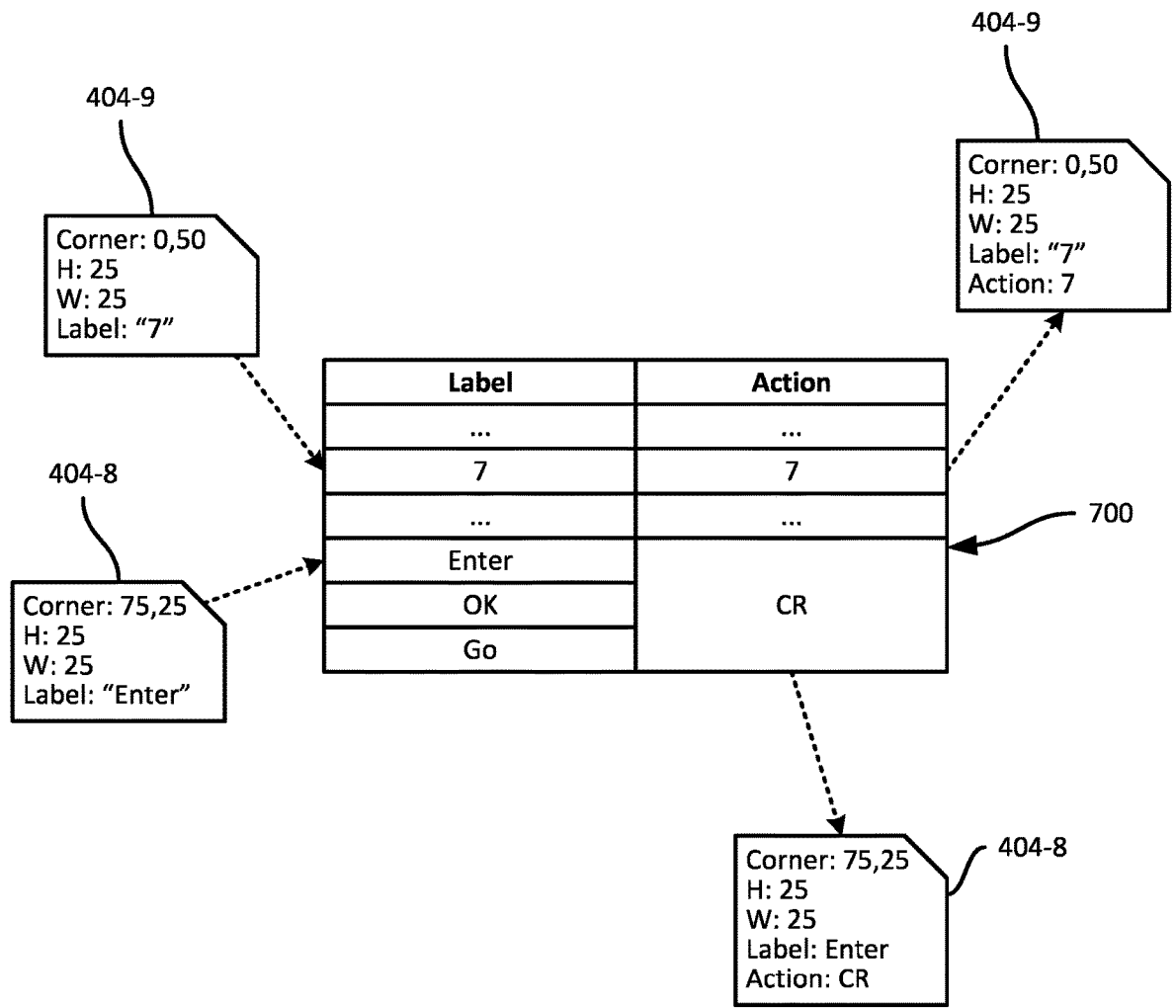
FIG. 7 is a diagram illustrating a further example performance of block 215 of the method of FIG. 2.

Turning to FIG. 7, a partial example mapping 700 is shown, along with the key definitions 404-8 and 404-9. As seen in FIG. 7, the definition 404-9 can be updated with a key action by selecting the record with the label "7" in the mapping 700, and inserting the corresponding action in the definition 404-9. In this example, the action and the label are the same. That is, selection of the key labelled "7" results in the generation of input data comprising the value "7". In other examples, however, the action and the label need not be the same. For example, the key definition 404-8 contains the label "Enter". The mapping 700 maps several labels, including "Enter", "OK", and "Go", to an action comprising a carriage return character identified as "CR". As will be apparent, a wide variety of other actions can also be mapped to labels, including a case toggle, e.g., in association with a "Shift" label, and the like.

Referring again to FIG. 2, upon selecting key actions at block 220, at block 225 the processor 108 is configured to generate a structured keyboard layout definition. For example, the processor 108 can be configured to generate a set of layout elements according to the predefined schema employed for virtual keyboard definitions in the system 100. For example, as illustrated in FIG. 8, the processor 108 can be configured to generate a file or set of files defining a set of hierarchical layout elements defining keys for a virtual keyboard layout by their positions, labels, and actions.

Figure 8:
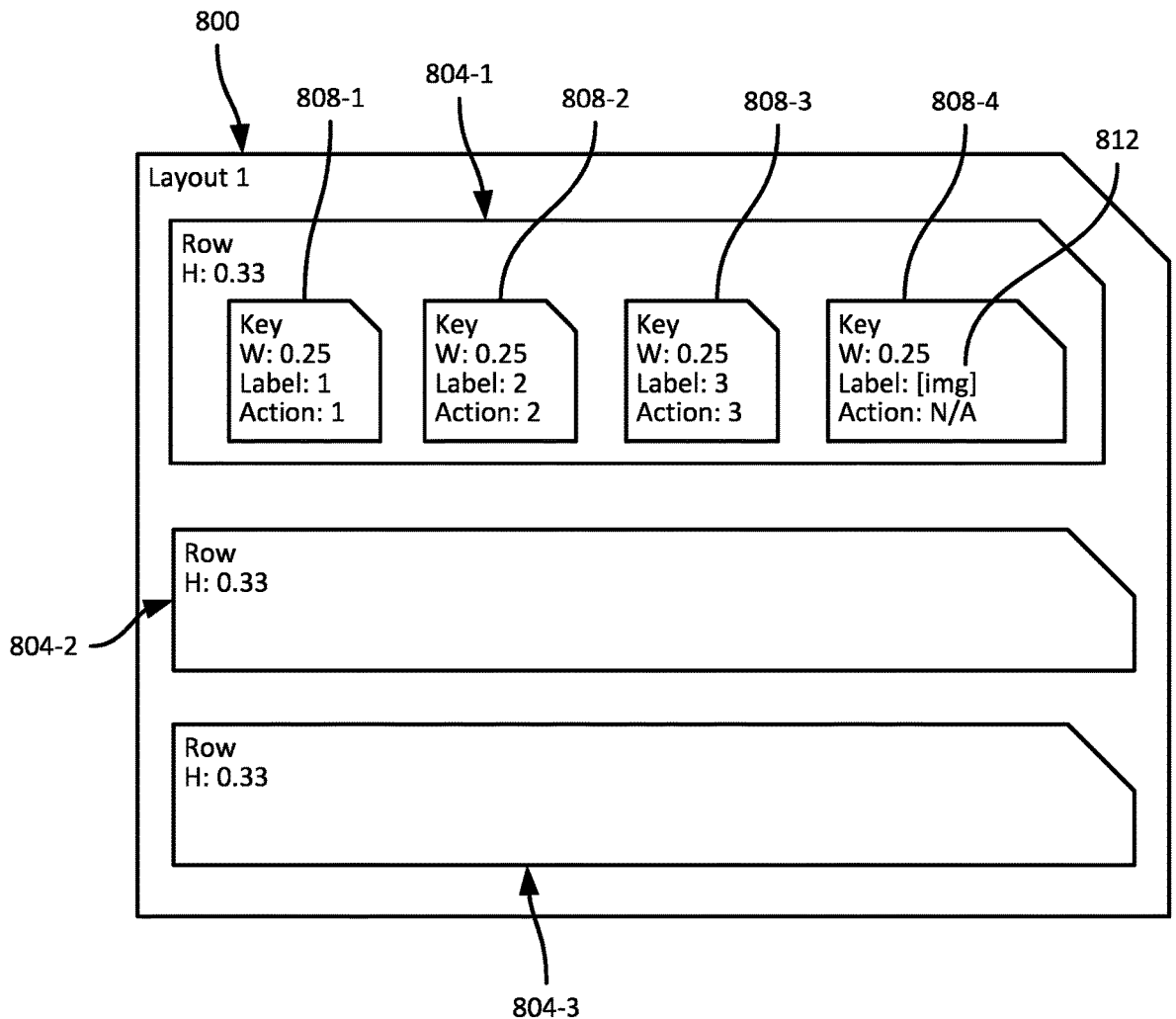
FIG. 8 is a diagram illustrating an example performance of block 220 of the method of FIG. 2.

In the example of FIG. 8, the elements generated at block 225 include a master layout element 800, acting as a container for the remaining elements. The element 800 can include properties such as a name, and in some examples can define a height and/or width of the virtual keyboard layout as a whole. In other examples, those values can be undefined in the element 800 itself (e.g., indicating to the client device 136 that the virtual keyboard is to occupy a default footprint on the display 156, such as the entire width of the display 156 and about 40% of the height of the display 156).

The layout elements generated at block 225 also include, in this example, a set of row elements 804-1, 804-2, and 804-3, corresponding to the three rows of keys visible in the image 300. The row elements 804 can be generated by dividing the key definitions 404 into sets with substantially matching vertical coordinates (e.g., of the top-left corner), and generating one row element for each set. Each row element 804, as shown in FIG. 8, can include a height attribute "H". The height attributes, in the illustrated example, indicate a fraction (e.g., between zero and one) of the total keyboard layout height to be occupied by the relevant row, and can be derived from the boundaries specified in the key definitions 404 previously generated. For instance, in the examples discussed above, each key boundary 400 has a detected height of twenty-five pixels, and therefore occupies one-third of the total height of the layout. Various other mechanisms can also be used to indicate row dimensions.

Each row element 804 can contain, in turn, a set of key elements 808 (example key elements 808-1, 808-2, 808-3, and 808-4 for the first row 804-1 are illustrated). Each key element 808 is generated from the corresponding key definition 404 derived from the image 300. The label and action values, for example, can be the same as those obtained via blocks 215 and 220. The key elements 808 can also include positional and/or dimensional attributes, such as a width attribute "W" shown in FIG. 8, that are derived from the key boundaries 400 but are not identical to the key boundaries 400. For instance, as shown in this example the width of each key element 808 is expressed as a fraction of the total width of the row 804-1.

Figure 6:
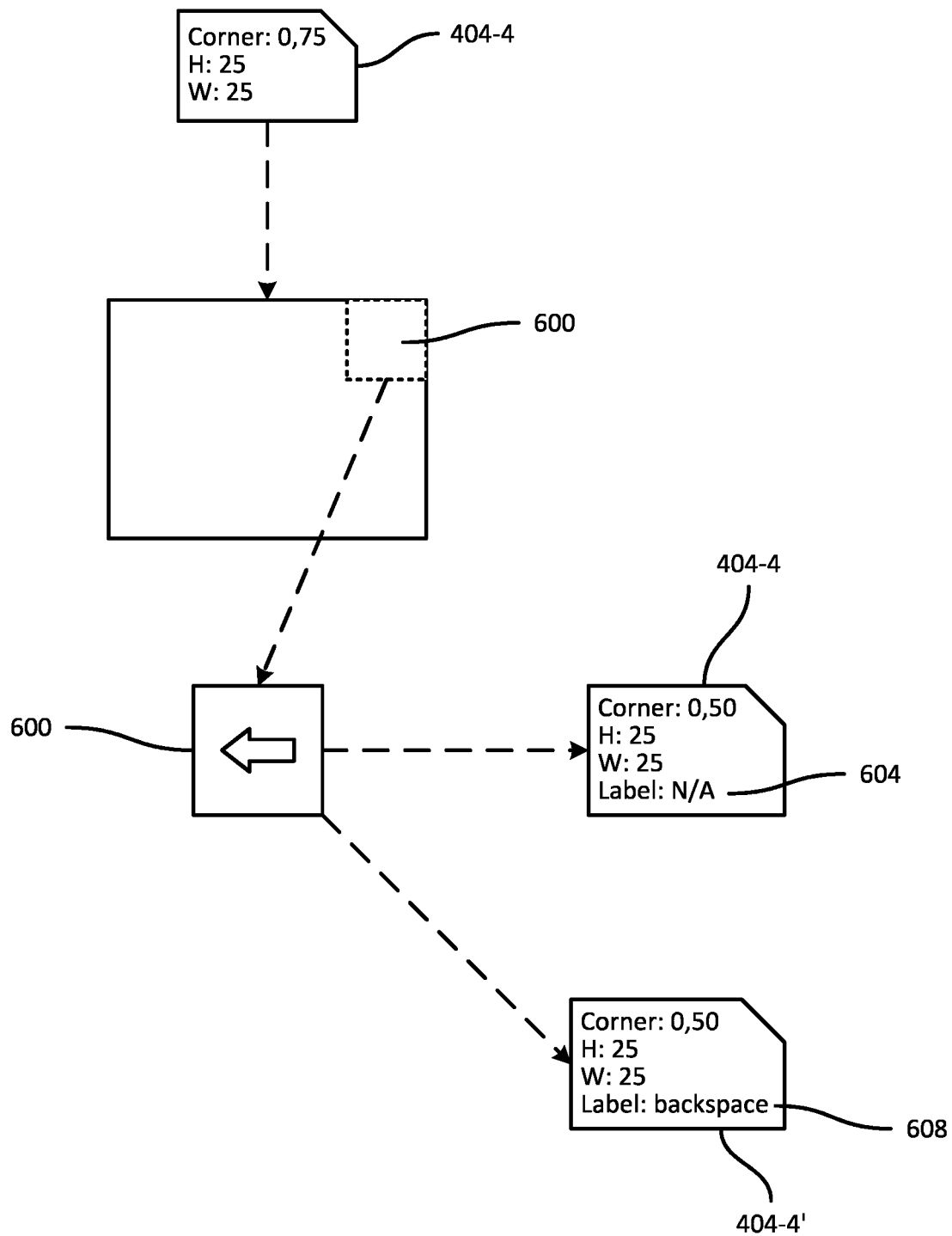
FIG. 6 is a diagram illustrating another example performance of block 215 of the method of FIG. 2.

Referring again to FIG. 2, during the generation of layout elements at block 225, at block 230 the processor 108 can be configured to determine whether any of the key definitions resulting from the detection of key boundaries at block 210 lack label strings (and therefore actions). When the determination at block 230 is affirmative, such as in the case of the key definition 404-4 (e.g., as shown in FIG. 6), at block 235 the processor 108 can be configured to add the corresponding patch (e.g., 600) from the image 300 to the layout element 808. The patch 600 can be embedded directly in the element 808 in some examples, or included with the layout elements as a separate file, with a pointer or other link 812 to the image inserted in the element 808-4.

When the determination at block 230 is negative for a given key definition 404, or after completion of block 235 for a key definition 404, the processor 108 proceeds to block 240, after each key boundary 400 from block 210 has been processed via blocks 225, 230 and (as necessary) 235.

Figure 9:
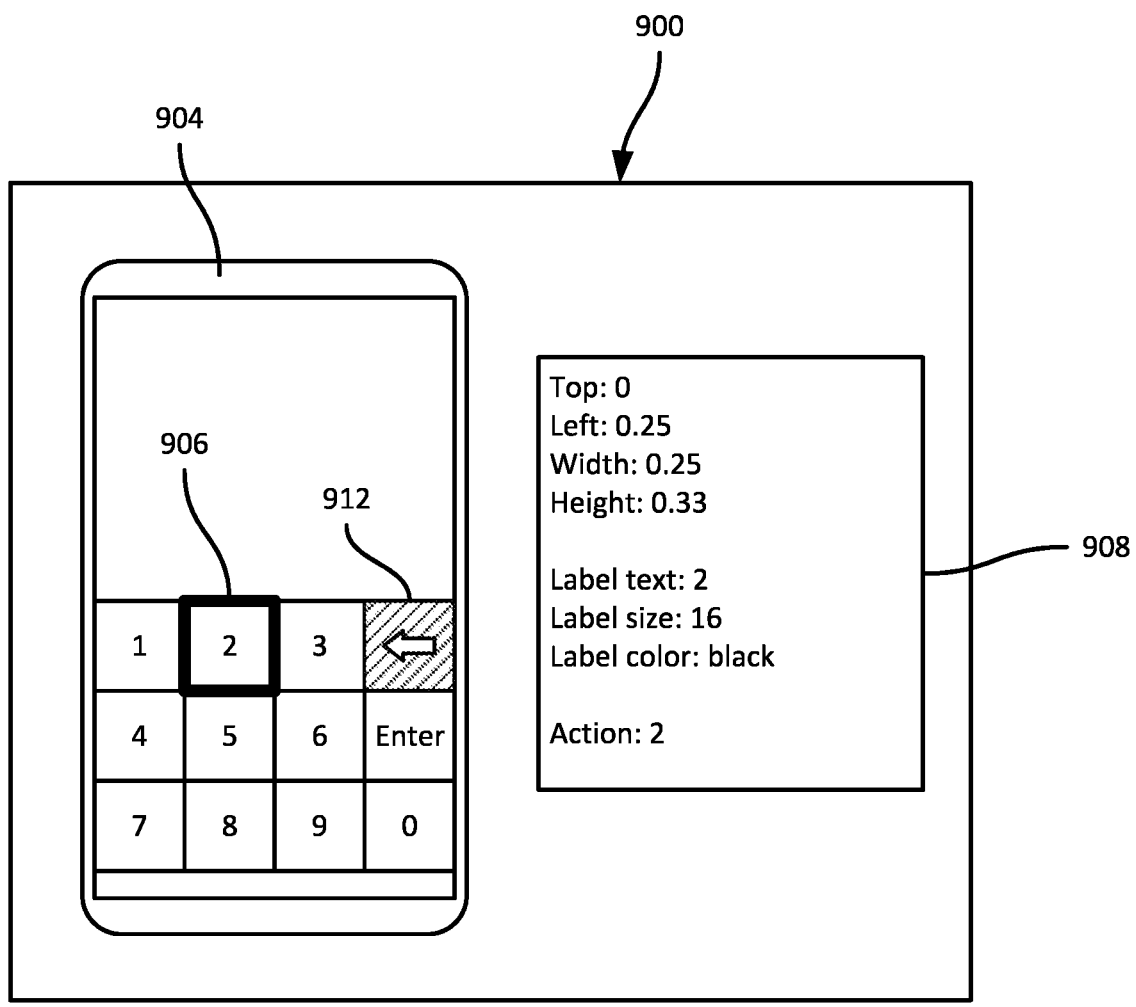
FIG. 9 is a diagram illustrating an example performance of block 240 of the method of FIG. 2.

Following generation of the layout elements, the layout elements can be presented on the display 124 at block 240, e.g., for verification and/or modification. In some examples, block 240 may be omitted and the layout definition can be deployed. FIG. 9 illustrates an example graphical interface 900 presented on the display 124 at block 240, via execution of the application 128. For example, the interface 900 can include a rendering 904 of the device 136, illustrating the appearance of a virtual keyboard according to the definition generated at blocks 225, 230 and 235.

Selecting a key in the rendering 904, e.g., as indicated by the heavier border 906, updates a parameters pane 908 of the interface 900, enabling an operator to view and update the parameters of the relevant key. In addition, any keys with missing labels (for which the determination at block 230 was affirmative) can be rendered with a visual indicator, such as the hatching 912 and the patch 600, to indicate to the operator that the underlying key element requires updating to insert the missing label and/or action.

Following any updates to the layout via the interface 900, the layout can be deployed to the client device 136 (and/or any other suitable client device) as noted earlier.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
obtaining an image of a keyboard layout;
detecting, from the image, a plurality of key boundaries;
determining a label string for a portion of the image defined by a corresponding key boundary from the plurality of key boundaries, wherein detecting the label string includes:
    extracting a patch of the image contained within the corresponding key boundary; and
    performing a character-recognition operation on the patch;
selecting, for the determined label string, a corresponding key action;
generating a keyboard layout definition for the image of the keyboard layout, the keyboard layout definition including a key definition for the corresponding key boundary, the key definition having: (i) a position for rendering of a key, (ii) a label configured to be rendered at the position of the key, and (iii) an action configured to be caused by selection of the key;
communicating the keyboard layout definition for deployment to a mobile device;
deploying the keyboard layout definition to the mobile device;
determining that the character-recognition operation failed; and
performing a classification operation on the patch.

2. The method of claim 1, further comprising:
prior to deploying the keyboard layout definition, controlling a display to render the keyboard layout definition; and
receiving an updated keyboard layout definition.

3. The method of claim 2, further comprising:
determining that a further portion of the image defined by a further key boundary from the plurality of key boundaries lacks a label string; and
rendering a further key corresponding to the further key boundary with a visual indicator on the display.

4. The method of claim 3, wherein the visual indicator includes a corresponding patch extracted from the input image.

5. The method of claim 1, further comprising:
determining, for the corresponding key boundary, at least one visual attribute selected from the group including: label font, label size, label color, or background color.

6. The method of claim 1, further comprising storing mappings between label strings and key actions; wherein selecting the corresponding key action includes:
selecting the key action corresponding to the label string in the mappings.

7. The method of claim 1, wherein the label is the same as the determined label string for the corresponding key boundary.

8. The method of claim 1, wherein the label is an extracted portion of the image.

9. A computing device, comprising:
a communications interface; and
a processor configured to:
    obtain an image of a keyboard layout;
    detect, from the image, a plurality of key boundaries, which includes:
        extract a patch of the image contained within the key corresponding boundary, and
        perform a character-recognition operation on the patch;
    determine a label string for a portion of the image defined by a corresponding key boundary from the plurality of key boundaries;
    select, for the determined label string, a corresponding key action;
    generate a keyboard layout definition for the image of the keyboard layout, the keyboard layout definition including a key definition for the corresponding key boundary, the key definition having: (i) a position for rendering of a key, (ii) a label configured to be rendered at the position of the key, and (iii) an action configured to be caused by selection of the key;
    communicate the keyboard layout definition for deployment to a mobile device via the communications interface;

deploy the keyboard layout definition to the mobile device;
determine that the character-recognition operation failed; and
perform a classification operation on the corresponding patch.

10. The computing device of claim 9, wherein the processor is further configured to:
prior to deploying the keyboard layout definition, controlling a display to render the keyboard layout definition; and
receive an updated keyboard layout definition.

11. The computing device of claim 10, wherein the processor is further configured to:
determine that a further portion of the image defined by a further key boundary from the plurality of key boundaries lacks a label string; and
render a further key corresponding to the further key boundary with a visual indicator on the display.

12. The computing device of claim 11, wherein the visual indicator includes a corresponding patch extracted from the input image.

13. The computing device of claim 9, wherein the processor is further configured to:
determine, for the corresponding key boundary, at least one visual attribute selected from the group including: label font, label size, label color, or background color.

14. The computing device of claim 9, further comprising a memory storing mappings between label strings and key actions;
wherein the processor is further configured, to select the corresponding key action, to select the key action corresponding to the label string in the mappings.

15. The computing device of claim 9, wherein the label is the same as the determined label string for the corresponding key boundary.

16. The computing device of claim 9, wherein the label is an extracted portion of the image.

17. A method, comprising:
obtaining an image of a keyboard layout;
detecting, from the image, a plurality of key boundaries;
determining a label string for a portion of the image defined by a corresponding key boundary from the plurality of key boundaries;
selecting, for the determined label string, a corresponding key action;
generating a keyboard layout definition for the image of the keyboard layout, the keyboard layout definition including a key definition for the corresponding key boundary, the key definition having: (i) a position for rendering of a key, (ii) a label configured to be rendered at the position of the key, and (iii) an action configured to be caused by selection of the key;
communicating the keyboard layout definition for deployment to a mobile device;
prior to deploying the keyboard layout definition, controlling a display to render the keyboard layout definition;
receiving an updated keyboard layout definition;
determining that a further portion of the image defined by a further key boundary from the plurality of key boundaries lacks a label string; and
rendering a further key corresponding to the further key boundary with a visual indicator on the display.

* * * * *